No. 722,815. PATENTED MAR. 17, 1903.
I. M. COOPER.
GRAIN SEPARATOR FOR THRESHING MACHINES.
APPLICATION FILED JUNE 10, 1901.
NO MODEL.
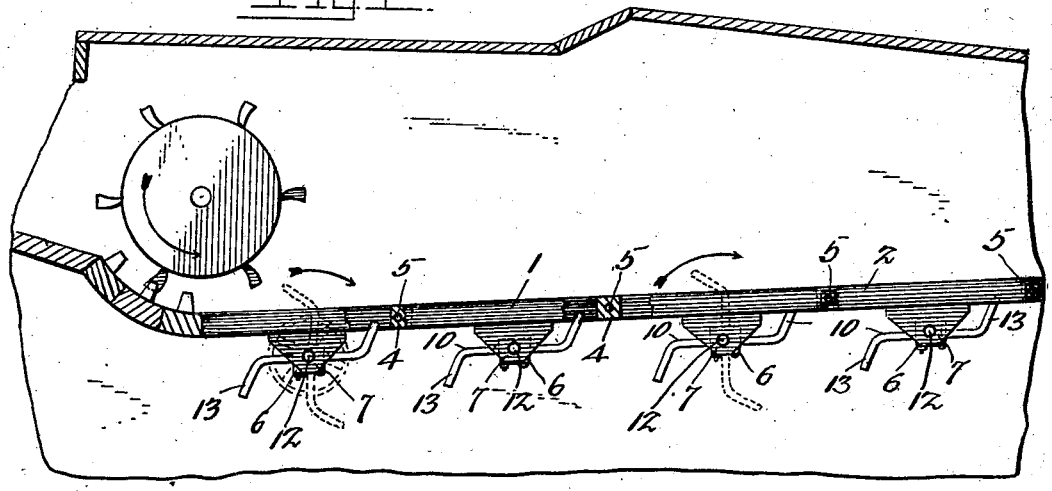
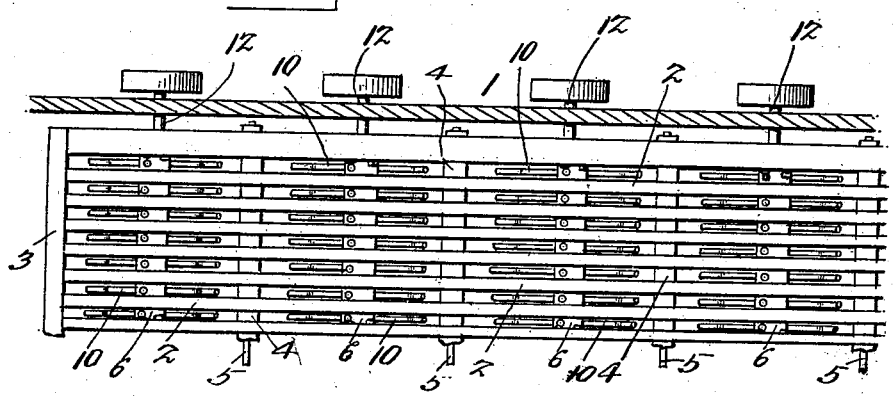
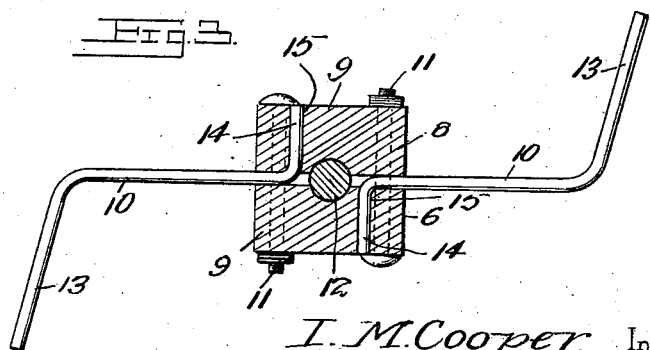
Witnesses
F. E. Alden.
J. W. Garner
I. M. Cooper, Inventor
by C. A. Snow & Co.
Attorneys

UNITED STATES PATENT OFFICE.

ISAAC M. COOPER, OF GLENELDER, KANSAS.

GRAIN-SEPARATOR FOR THRESHING-MACHINES.

SPECIFICATION forming part of Letters Patent No. 722,815, dated March 17, 1903.

Application filed June 10, 1901. Serial No. 63,953. (No model.)

*To all whom it may concern:*

Be it known that I, ISAAC M. COOPER, a citizen of the United States, residing at Glenelder, in the county of Mitchell and State of Kansas, have invented a new and useful Grain-Separator for Threshing-Machines, of which the following is a specification.

My invention relates to an improvement in grain-separators for threshing-machines; and it consists in certain improvements in the construction of the revoluble pickers which coact with the straw-rack therewith to toss and shake the straw to dislodge the grain therefrom and move the straw over the rack from the threshing mechanism to the discharge end of the machine, as is hereinafter fully described and claimed.

In the accompanying drawings, Figure 1 is a vertical section of a threshing-machine provided with a grain-separator embodying my improvements. Fig. 2 is a similar view at right angles to Fig. 1. Fig. 3 is a vertical transverse sectional view of one of the revoluble pickers.

The straw-rack 1 is located in the casing of the threshing-machine and extends from the threshing mechanism to the discharge end of the machine, the straw as it leaves the threshing mechanism passing over the straw-rack. Said straw-rack comprises a series of longitudinally-disposed slats or bars 2, which are connected together at their ends by cross-bars 3 and are connected together at regular intervals by blocks 4. The said bars or slats 2 are suitably spaced apart, the blocks 4 being placed between them. In practice the said slats or bars 2 are about an inch wide and said blocks 4 are of a similar width. Bolts 5 are passed transversely through alined openings in said bars 2 and said blocks 4. The said bolts clamp the said bars and blocks together and materially add to the strength of the rack.

On the under side of the straw-rack at regular distances apart are a series of revoluble pickers 6, which have their bearings in blocks 7, that are secured to the side bars of the rack on the under sides thereof. Each of the said revoluble pickers comprises a stock 8, formed of a pair of separable sections 9, picker-arms 10, bolts 11, which connect the said sections together, and an axle-shaft 12, on which the said sections are clamped by the said bolts. Each of the picker-arms 10 is a metallic bar, preferably of steel, having its outer end bent nearly at right angles, as at 13, and its inner end bent at right angles, as at 14. The inner portions of the said picker-arms are clamped between the sections 9 of the stock, and the said right-angled inner ends 14 of said picker-arms are inserted in openings 15 in the said sections of the stock. It will be observed by reference to Fig. 3 of the drawings that the opposing sides of the stock-sections do not contact with each other, but are clamped firmly on the shaft 12 and on the picker-arms. Thereby the picker-arms are firmly secured between the sections of the stock and are prevented from turning therein. The picker-arms extend in opposite directions from the stock, and when the picker is rotated the said picker-arms pass between the bars or slats 2 of the straw-rack. The bent outer ends 13 of the said picker-arms move rearwardly above the straw-rack, and as the said picker-arms rise above the straw-rack during their rotary motion they serve to toss the straw upwardly on the rack and urge it rearwardly on the rack, thereby effectually shaking the straw, dislodging the grain therefrom, and acting efficiently in discharging the straw from the machine. The direction of rotation of the pickers is indicated by the arrows in Fig. 1. As the grain is dislodged from the straw by the action of the revoluble pickers the grain falls through the spaces between the bars or slats of the straw-rack and is effectually separated from the straw and may be at once treated by the blower or winnower, which is usually employed in machines of this class, as my improved straw-rack renders the use of the sieves and chaffing-riddles usually employed in machines of this class unnecessary. Owing to the provision of the blocks 4, which, in effect, form cross-bars, the straw is prevented from passing or being carried through the openings in the rack by the picker-arms, as will be understood, and is retained on the rack until discharged at its rear end.

In constructing the straw-rack the blocks 4 may be dispensed with and cross-slats employed in lieu thereof, in which event the said cross-slats will be disposed under the slats 2 and bolted thereto.

Having thus described my invention, I claim—

In a rotatable picker of the class described, the combination with a shaft, of a pair of stock-sections disposed on opposite sides of the shaft and out of contact with each other, each of said sections having one or more transverse openings, oppositely-extending picker-arms situated between the adjacent sides of the stock-sections and provided with extensions at their inner ends entering the transverse openings, and bolts passing through said stock-sections and serving to draw them toward one another to simultaneously clamp them on the shaft and the picker-arms between them.

In testimony that I claim the foregoing as my own I have hereto affixed my signature in the presence of two witnesses.

ISAAC M. COOPER.

Witnesses:
BENJAMIN F. CASEY,
BENJAMIN WOOLMAN.